United States Patent

Zimmerman et al.

[11] Patent Number: 5,857,481
[45] Date of Patent: Jan. 12, 1999

[54] TIRE INFLATION SYSTEM AND PROCESS

[76] Inventors: Lewis Zimmerman, 1012 Bunker Dr., Unit 103, Fairlawn, Ohio 44333; Steven M. Zimmerman, 581 Haskell Dr., Akron, Ohio 44333

[21] Appl. No.: 632,797

[22] Filed: Apr. 17, 1996

[51] Int. Cl.$^6$ ........................................... B60C 29/06
[52] U.S. Cl. ................................. 137/227; 137/231
[58] Field of Search ........................ 137/227, 223, 137/231; 251/149.9

[56] References Cited

U.S. PATENT DOCUMENTS

| | | | |
|---|---|---|---|
| 938,522 | 11/1909 | Swain | 137/227 |
| 1,296,657 | 3/1919 | Hammond | 137/231 |
| 1,385,080 | 7/1921 | Key | 137/231 |
| 1,699,378 | 1/1929 | Smith | 137/227 |
| 2,026,249 | 12/1935 | Pierson | 137/227 |
| 2,047,405 | 7/1936 | Byars | 137/227 |
| 3,926,241 | 12/1975 | Evankovich et al. | 137/223 |
| 4,311,328 | 1/1982 | Truchet | 285/308 |
| 4,397,445 | 8/1983 | Burquier | 251/149.9 |
| 4,895,199 | 1/1990 | Magnuson et al. | 152/415 |
| 4,969,493 | 11/1990 | Lee | 137/227 |
| 5,313,827 | 5/1994 | Yovichin | 73/146 |

OTHER PUBLICATIONS

"Remote Mount Automatic Inflation Kit" Myers advertisement.

*Primary Examiner*—Marguerite McMahon
*Attorney, Agent, or Firm*—Oldham & Oldham Co., L.P.A.

[57] ABSTRACT

Tire inflation system and process, especially intended for truck or heavy equipment tires. A tire inflation system of this invention comprises, in the order named, a tubular air-inlet member adapted to be connected to an air pressure source and having an on-off valve therein; a pressure regulator which is setable to a desired outlet pressure; swivel fitting; a two-step disconnect coupler having a manual actuator which, on a first actuation, releases pressure downstream of a coupler and, on a second actuation, releases an air hose which is releasably connected to the coupler on the downstream thereof; and an air hose releasably connected to the coupler and having at its outlet end a clip-on chuck for connection to an air valve of a tire to be inflated. The preferred coupler is a push-button coupler. Air flow through the system may be initiated by opening the on-off valve. When desired air pressure in the tire has been reached or when a user of the system desires to stop inflation of a tire as, for example, when a user senses an unsafe condition which may lead to blow out, the user actuates the manual actuator of the coupler once to stop air flow (if not already stopped) and to vent downstream air pressure. The user then actuates the manual actuator a second time to disconnect the air hose from the coupler. The system is safe and easy to use and meets or exceeds all current OSHA requirements.

9 Claims, 2 Drawing Sheets

TIRE INFLATION SYSTEM AND PROCESS

TECHNICAL FIELD

This invention relates to tire inflation systems and processes for inflating tires. More particularly, this invention relates to a tire inflation system for safe inflation of tires on a truck or earth moving equipment for example, by an operator who is at a position remote from the tire being inflated.

BACKGROUND OF THE INVENTION

Inflation of a truck tire, or a tire used on other types of larger vehicles, such as tractors, trailers, buses and off-road machines, is inherently hazardous undertaking unless proper precautions are taken. Tires used on such vehicles are much larger than automobile tires and are typically operated at higher inflation pressures (say about 50–55 psig); as a result, when a tire of this size bursts, there is the possibility of death or serious bodily harm for anyone standing in the trajectory of the tire, unless a proper safety cage or other restraining device is used. Also, an operator who is filling such a tire should be at a position remote from the tire itself, i.e., out of trajectory of the tire. Failure is typically in the tire sidewall. Such failure may occur in the tire sidewall. A common mode of failure is breaking or weakening of steel reinforcing cords. A common mode of failure of this type is a "zipper rupture," so called because of the resemblance of a tire ruptured in this manner to an open zipper. A common cause of such failure is use of the tire while either under inflated or overloaded.

The United States Occupational Safety and Health Administration (OSHA) has promulgated safety and health standards regarding the servicing of wheels and tires used on large vehicles such as trucks, tractors, trailers, buses and off-road machines. These standards are found at 29 CFR §1910.177. Briefly, these standards require all tubeless and tube-type medium and large truck tires to be inflated using OSHA-approved restraining device such as a safety cage or barrier, and using a clip-on air chuck with a pressure regulator and an extension air hose. The Rubber Manufacturers Association (RMA) of Washington D.C. goes further; it recommends that the OSHA procedures be applied to steel cord radial medium- and light-truck tires as well, and publishes bulletins explaining how zipper ruptures can occur and outlining recommended safety inspection procedures.

SUMMARY OF THE INVENTION

This invention according to one aspect provides for inflation or deflation of a tire at a remote location, which system comprises:

(a) means forming a compressed air passageway extending therethrough and including an on-off valve for controlling air flow through the passageway and a pressure gauge downstream of the on-off valve;

(b) a swivel fitting attached to said means so as to permit swivel motion relative thereto, the swivel fitting having extending therethrough a passageway which has an inlet portion and an outlet portion which are angularly disposed relatively to one another;

(c) a two-step disconnect coupler having a passageway extending therethrough, the coupler being connected at an inlet end to the swivel fitting and having at an outlet end means permitting releasable coupling of an air hose thereto, the coupler further including two-step manual actuation means constructed and arranged so that a single actuation of the actuation means releases downstream air pressure and a second actuation of the actuating means disconnects the air hose; and (d) at least one air hose having an inlet end and an outlet end, the air hose having at its inlet end a connector adapted to be releasably coupled to the coupler and having at its outlet end a chuck for releasable connection of the air hose to a tire, the air hose being of sufficient length to permit inflation of a tire at a location remote from the coupler.

In a preferred embodiment, the means forming a compressed air inlet passageway comprises a tubular fitting adapted to be connected to a source of compressed air and including the on-off valve, and an adjustable pressure regulator which includes the pressure gauge; the manual actuation means in the two-step disconnect coupler is a push-button actuator which, when pressed once, releases downstream air pressure and, when pressed a second time, disconnects the air hose; and the chuck is a clip-on chuck.

This invention according to a second aspect provides a process for inflating a tire at a location remote from an operator. This process uses a system as described in the preceding paragraph and includes the steps of positioning a tire to be inflated at a location remote from the on-off valve and the coupler of the system, coupling the chuck at the outlet end of the air hose to a tire valve, opening the on-off valve, allowing compressed air to flow through the system until the tire has been inflated to the desired pressure, and then actuating the coupler of the system once to release air pressure downstream of the coupler. The coupler may also be actuated a second time to disconnect the air hose if desired.

This invention provides a system and a process which meets or exceed OSHA requirements and which in addition permit swivel movement of the air hose so that it does not become kinked or entangled and which permit quick and safe inflation of a tire.

DESCRIPTION OF THE PREFERRED EMBODIMENT

Figure 1:
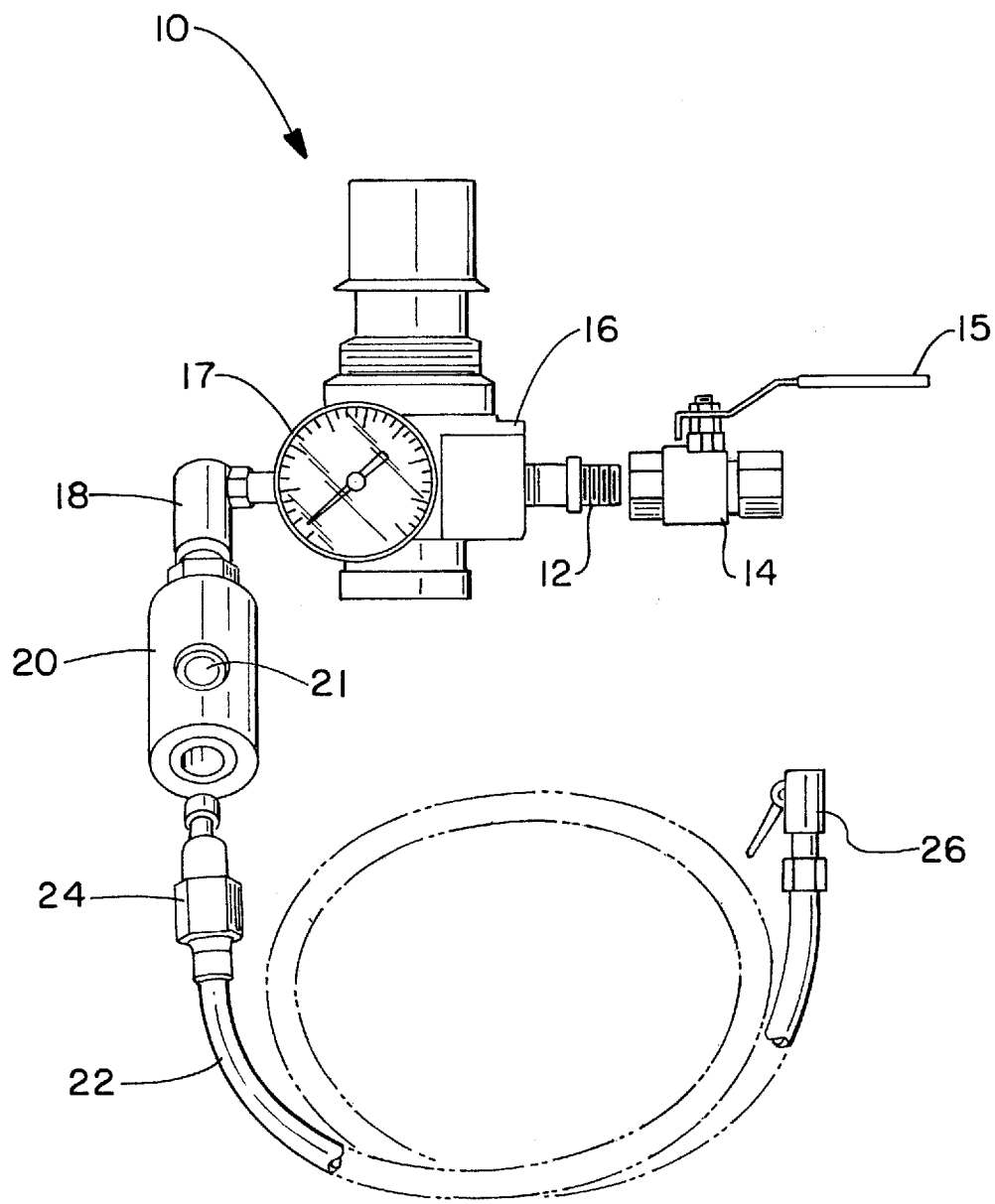
FIG. 1 is an elevational view of the tire-inflation system of this invention as a whole.

This invention will now be described in detail with particular reference to the best mode and preferred embodiment thereof Referring now to FIG. 1, a remote tire-inflation system 10 according to this invention comprises a tubular member 12 forming an air inlet extending therethrough and having therein a manually operated on-off valve 14 having a lever 15 for manual actuation, a pressure regulator 16 having a pressure gauge 17, a 90° swivel fitting 18, a double release coupler 20 having a push-button actuator 21, and at least one flexible air hose 22 of sufficient length to permit a user to be at a location remote from a tire which is being inflated and having at its first or air inlet end a male coupling member 24 which is adapted to be releasably received in a socket in coupler 20, and at its second or air outlet end a clip-on chuck 26 for pressure-tight connection of air hose 22 to a tire to be inflated.

Figure 2:
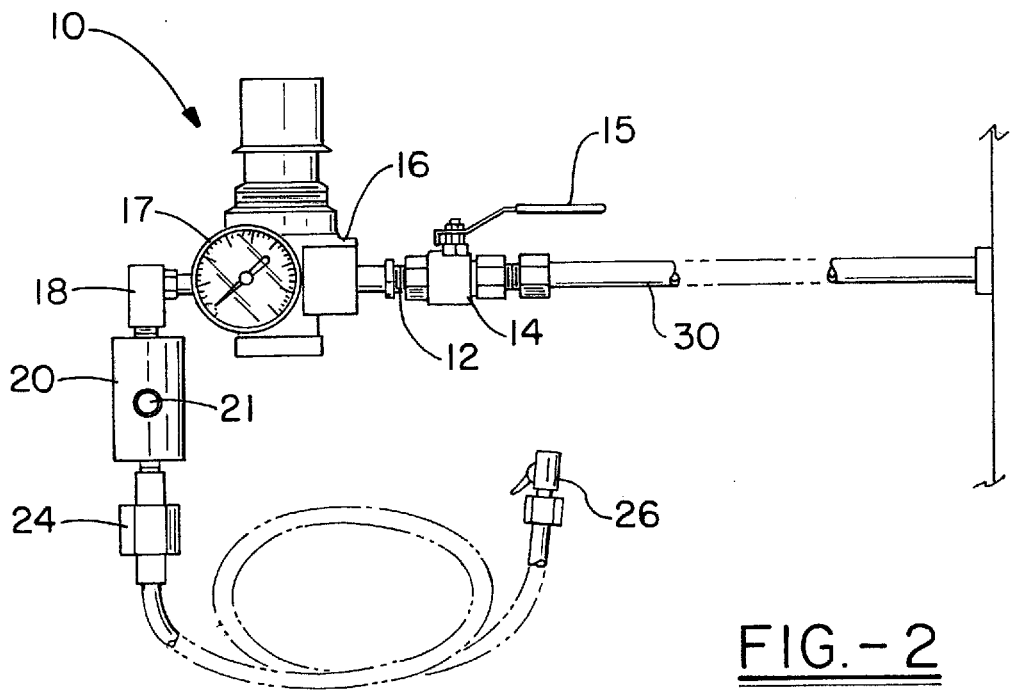
FIG. 2 is a partial elevational view of the tire-inflation system of this invention, showing this system connected to an air supply hose.

As shown in FIG. 2, the system 10 of this invention is adapted to be connected by a tubular air inlet member 12 to a compressed air supply hose 30, which, in turn, is connected to a compressed air source not shown.

Figure 3:
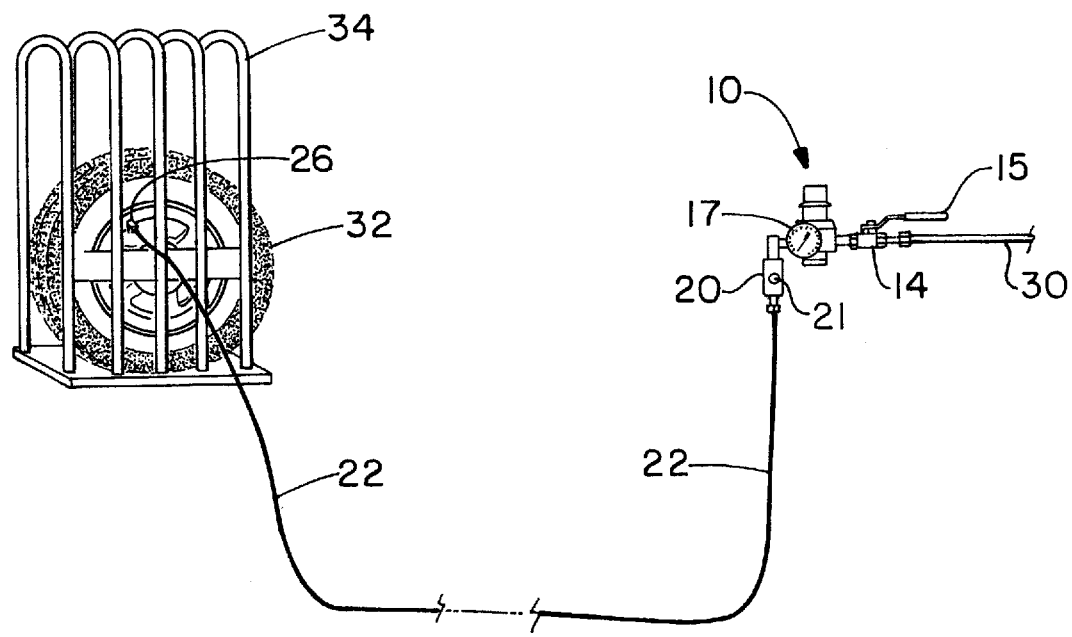
FIG. 3 is an elevational view of a tire-inflation system of this invention (shown on a reduced scale) attached to a tire mounted for inflation in a safety cage.

As shown in FIG. 3, the air hose 22 of a system 10 of this invention is connected at its outlet end one or more tires 32 to be inflated. Tire 32 is placed inside a safety cage 34 or other OSHA-approved restraining device for workers' safety.

The tubular member 12, pressure regulator 16, swivel fitting 18, double release coupler 20 and flexible air hose 22 are connected in series in the order named. Each has a passageway for compressed air extending therethrough, and the passageways in respective components are so aligned as to form a continuous compressed-air passageway extending throughout the entire system.

As will be noted in FIG. 3, the tire 32 to be inflated and its safety cage 34 are at a location remote from the location at which the user is positioned. This is made possible by a substantial length of air hose 22. The user of the system is positioned to the right as shown in FIG. 3, where he/she can easily operate the lever 15 of in-line on-off valve 14 and the pushbutton actuator 21 of coupling 20.

The tubular air inlet member 12 has a female opening at its inlet end to permit insertion and coupling of an air supply hose 30 as shown in FIG. 2. The on-off valve 14 therein is an in-line on-off valve which has a lever 15 for manual actuation. This valve may be a conventional rotary plug valve.

Pressure regulator 16 may be a conventional pressure regulator which meets OSHA requirements, and which can be preset to a desired outlet pressure and which has a pressure gauge 17 to indicate outlet pressure.

If one prefers, one may provide other means forming a compressed-air inlet passageway extending therethrough and including an in-line on-off valve 14 for controlling air flow through the passageway and a pressure gauge 17 downstream of the on-off valve, but with no pressure regulator, while remaining in compliance with current OSHA requirements. Use of a pressure regulator as shown is preferred for increased safety and ease of operation.

Swivel fitting 18 is in the shape of an elbow having a 90° bend. The passageway extending through the swivel fitting likewise has a 90° bend in the preferred embodiment; although, more broadly, this passage way may have an inlet portion and an outlet portion which are angularly disposed relative to one another, preferably but not necessarily at an angle of 90°. This swivel fitting 18 is swivel mounted in pressure regulator 16 so as to permit swivel motion relative thereto. It is not necessary to provide for 360° swivel motion; A swivel motion of 90° is sufficient and a swivel fitting providing this degree of motion is preferred.

Coupler 20 is a two-step manually operable disconnect coupler which is so constructed and arranged that a single or first actuation releases downstream air pressure and a second actuation of the actuator disconnects an air hose 22 which is connected on the downstream side thereof when the system 10 is in operation or set up for operation. To this end, coupler 20 has means (i.e., a female socket or joint) at its outlet end for permitting releasable coupling of air hose 22. Coupler 20 is connected at its inlet end to the swivel fitting 18. To permit venting of downstream air pressure in air hose 22 before the air hose is disconnected entirely, a vent (not shown) may be provided in the body of coupler 20. This vent is closed when the coupler is in operating mode, and is placed in fluid communication with the air hose 22 by the first pressing of button 21. Alternatively, the nipple of the quick connect coupler associated with air hose 22 may be released from pressurized engagement with coupler 20 while not releasing it entirely from coupler 20. This would also allow venting of air pressure in a similar manner. In operation, the air hose 22 is coupled to coupler 20 and allows inflation pressure to be eliminated while hose 22 is still coupled to coupler 20. The coupler 20 thus provides safe operation of system 10, while simplifying its use. The coupler allows an operator to simply reconnect inflation pressure at any time by reinserting the quick connect coupler or hose 22 into pressurized engagement with coupler 20.

A two-step disconnect coupler shown and described in U.S. Pat. No. 4,397,445 may be used in place of the push-button coupler actually shown. The coupler shown in U.S. Pat. No. 4,397,445 is manually actuated by a lever but has the same operating mode as the preferred coupler herein. The preferred coupler herein is manufactured by Staubli (the assignee of U.S. Pat. No. 4,397,445) and is available as Model number ISC-06 under the trade name ConnectUS or Prevost from the Prevost Group, Duncan, S.C., United States of America.

Air hose 22 is of sufficient length to enable a user of the system to stand at a location remote from the location at which a tire 32 (FIG. 3) is being inflated and out of the trajectory of the tire. This is done for safety reasons and in compliance with OSHA guidelines. Air hose of the type used herein is commercially available in 25-foot and 50-foot lengths, and either satisfies the safety and OSHA requirements. The tubular connector 24 at the upstream of inlet end or air hose 22 is a male fitting or nipple which is received releasably in an outlet end socket in connector 20. The chuck 26 at the downstream end of air hose 22 is one which can be safely and releasably connected to a tire valve inflation stem. In accordance with current OSHA requirements, a clip-on chuck is preferred although other types of air chucks may be used.

Inflation of a tire using a tire inflation system according to this invention will now be described.

First, a tire 32 is mounted on a rim and a resulting tire/rim/wheel assembly is placed in a safety cage 34, as shown in FIG. 3. The location of the safety cage and the tire/rim/wheel assembly therein is remote from the location at which a user of the system will stand (shown to the right in FIG. 3) and is such that the location at which the user stands is out of the trajectory of the tire.

Second, the user couples a chuck 26 associated with the tire inflation system 10 and specifically when air hose is connected to a tire valve (not shown in detail) associated with tire 32.

Third, the user opens the on-off valve 14 using handle 15. This initiates air flow through the system and to the tire.

Fourthly, inflation of tire 32 is continued until the desired air pressure therein is reached. Then air flow to the tire is stopped.

Fifth, the user than actuates manual actuator 21 of the two-step disconnect coupler 20 a first time to release air pressure downstream of the coupler, i.e., in air hose 22.

If desired, the user may then actuate the push-button actuator 21 of the two-step disconnect coupler 20 a second time to disconnect the air hose 22 and specifically fitting 24 thereon from the coupler 20. The user can then safely disconnect the air hose 22 and specifically chuck 26 thereof from the tire valve. In operation, no disconnection of hose 22 from coupler 20 may be necessary, while coupler 20 allows air pressure to be released for safe operation. Thereafter, reconnection of hose 22 to coupler 20 into pressurized engagement can be easily done at any time for inflation procedures.

Inflation of a tire can be stopped either by the first actuation of push-button 21 of coupler 20 or by other means as, for example, by setting the outlet pressure of pressure regulator 16 at the desired tire inflation pressure. In the latter case, air flow to the tire will stop when the desired air pressure is reached, and the first actuation of push button 21 will then release air pressure in the hose 22.

In case an operator observes or hears popping or ripple sounds, or sees or hears other warnings that the tire being inflated may burst, the user can immediately stop inflation by pressing push button 21 once to stop air flow and release downstream pressure in hose 22.

The present invention provides a tire-inflation system and process which are safe, effective, easy to use, and which meet or exceed current OSHA requirements. This system and process are particularly useful for inflation and controlled deflation of truck and/or earth moving equipment tires of all sizes (light-, medium-, or heavy-truck tires) and for other tires or larger than automobile tire size. It should also be apparent that another or further hoses 22 and couplers 20 may be used simultaneously for inflation of multiple tires.

The system of this invention can also be used for controlled deflation of a tire. A tire to be deflated is placed inside a suitable cage 34, and the system 10 of this invention is hooked up to the tire in the manner shown in FIG. 3 and as previously described herein. The user of the system then pushes push button 21 once to deflate the tire.

The system of this invention can be used either at a tire-maintenance facility or for a road service call. A 25-foot air hose 22 is usually sufficient for use at a tire maintenance facility; a 50-foot air hose is preferred during a road service call in order to assure that a technician using the system will be positioned away from the trajectory of the tire and at a safe distance. This invention is especially useful for those who maintain tire maintenance facilities as, for example, tire dealers, truck or other vehicle fleet operators, and tire repair facilities which are capable of repairing truck or other vehicle tires.

The two-step disconnect coupler used in the practice in the present invention is a safety feature which assures safely pressurizing of an air hose used for tire inflation prior to disconnection of the air hose from the tire being inflated. The preferred push-button coupler is especially easy to use.

The swivel fitting 18 allows a degree of flexibility in the positioning of air hose 22 relative system component upstream thereof, notably the pressure regulator 16 and the on-off valve 14. This flexibility in use and position of the air hose avoids kinking of the air hose which, in turn, can cause premature wear and tear. The present invention provides a system and a process for tire inflation which are safe, easy to use, and which result in a high degree of productivity of the user.

While this invention has been described in detail with reference to the best mode and preferred embodiment thereof, it shall be understood that such description is by way of illustration and not limitation.

What is claimed is:

1. A tire inflation system for inflation of large vehicle tires to inflation pressures above automobile tires and at a remote location, said system comprising:

(a) a compressed air inlet coupled to a source of compressed air and having a passageway extending therethrough and including an on-off valve for controlling air flow through said passageway and a pressure gauge downstream of said on-off valve;

(b) a swivel fitting attached to said inlet so as to permit swivel motion relative thereto, said swivel fitting having a passageway extending therethrough, said passageway having an inlet and outlet portion which are angularly disposed relative to one another;

(c) a two-step disconnect coupler having a passageway extending therethrough, said coupler being connected at an inlet end to said swivel fitting and having means at an outlet end for permitting releasable coupling of an air hose thereto, said coupler further including two-step manual actuation means constructed and arranged so that a single actuation of said actuation means releases downstream air pressure and a second actuation of said actuation means disconnects the air hose;

(d) said air hose having an inlet end and an outlet end, said air hose having at its inlet end a connector adapted to be releasably coupled to said coupler and having at its outlet a chuck for releasably connecting said air hose to a tire, said air hose being of sufficient length to permit inflation of a tire at a location remote from said coupler.

2. A tire inflation system as claimed in claim 1 wherein said compressed air inlet passageway comprises a tubular member forming an air inlet and a pressure regulator connected to said air inlet downstream thereof, said tubular member having said manually operated on-off valve therein and said pressure regulator having said pressure gauge therein and being setable to a predetermined air pressure.

3. A tire inflation system as claimed in claim 1 wherein said swivel fitting is capable of rotation through an angle of at least 90°.

4. A swivel fitting as claimed in claim 1 wherein said swivel fitting is L-shaped and the inlet portion and the outlet portion of the passageway extending therethrough are disposed at an angle of 90° relative to one another.

5. A tire inflation system as claimed in claim 1 wherein the two-step manual actuation means of said coupler comprises a push button constructed and arranged so that a single pressing of said push button releases downstream pressure, and a second pushing of said push button disconnects said air hose.

6. A tire inflation system as claimed in claim 1 wherein said chuck at the outlet end of said air hose is a clip-on chuck.

7. A process for inflating a large tire to inflation pressures above automobile tires at a location remote from an operator, said process comprising:

(a) providing a tire inflation system as claimed in claim 1;

(b) positioning said system and a tire to be inflated relative to each other such that the tire to be inflated is at a location remote from the on-off valve and the coupler of said system;

(c) coupling a chuck associated with an air hose of said system to a tire valve associated with said tire;

(d) opening said on-off valve;

(e) inflating said tire until desired pressure is reached;

(f) actuating a manual actuator of a two-step disconnect coupler once to release air pressure downstream of the coupler; and (g) actuating the manual actuator of said two-step disconnect coupler a second time to disconnect an air hose downstream of said coupler from said coupler.

8. A process according to claim 7 wherein said tire inflation system includes a setable pressure regulator and said process includes presetting outlet pressure of said pressure regulator to a desired tire inflation pressure.

9. A process according to claim 7 wherein said manual actuator of said coupler comprises a push button and wherein said user of said system presses said push button once to release downstream air pressure and presses said push button a second time to disconnect an air hose downstream of said coupler from said coupler.

* * * * *